United States Patent
Aitchison et al.

(10) Patent No.: US 9,050,673 B2
(45) Date of Patent: Jun. 9, 2015

(54) MULTILAYER OVERLAYS AND METHODS FOR APPLYING MULTILAYER OVERLAYS

(75) Inventors: Trevor Aitchison, Powys (GB); R. Allan Heflin, Lake Forest, IL (US)

(73) Assignee: EXTREME SURFACE PROTECTION LTD., Windsor, Ontario (CA)

( * ) Notice: Subject to any disclaimer, the term of this patent is extended or adjusted under 35 U.S.C. 154(b) by 769 days.

(21) Appl. No.: 12/488,167

(22) Filed: Jun. 19, 2009

(65) Prior Publication Data

US 2010/0323213 A1   Dec. 23, 2010

(51) Int. Cl.
*B32B 15/00* (2006.01)
*B23K 9/04* (2006.01)
(Continued)

(52) U.S. Cl.
CPC ......... *B23K 9/042* (2013.01); *Y10T 428/12493* (2015.01); *Y10T 428/12076* (2015.01); *Y10T 428/12056* (2015.01); *B22F 5/10* (2013.01); *B22F 7/08* (2013.01); *B23K 9/167* (2013.01); *B23K 9/173* (2013.01); *B23K 35/0261* (2013.01); *B23K 35/3033* (2013.01); *B23K 35/3053* (2013.01); *B23K 35/308* (2013.01); *B23K 2201/18* (2013.01); *B23K 2201/34* (2013.01); *B23K 2203/04* (2013.01);
(Continued)

(58) Field of Classification Search
USPC ................ 428/552, 634, 621; 219/74, 76.12, 219/76.14, 76.15, 76.16; 138/145, 146
See application file for complete search history.

(56) References Cited

U.S. PATENT DOCUMENTS 2,709,213 A * 5/1955 Gibson ..................... 219/76.15
3,760,863 A   9/1973 Weyersberg
(Continued)

FOREIGN PATENT DOCUMENTS

CA   1018474 A1   10/1977
CA   1158073 A    12/1983
(Continued)

OTHER PUBLICATIONS

Nassau, K. and Nassau, J., "The History and Present Status of Synthetic Diamond, Part I and Part II", *The Lapidary Journal*, vol. 32, No. 1, (Apr. 1978) and vol. 32, No. 2, 15 pages (May 1978).
(Continued)

*Primary Examiner* — Mark Ruthkosky
*Assistant Examiner* — Daniel J Schleis
(74) *Attorney, Agent, or Firm* — K&L Gates LLP

(57) ABSTRACT

A wear resistant multilayer overlay includes a first layer on at least a surface of an article, and a second layer metallurgically bonded to at least a portion of the first layer. The first layer includes a first continuous metallic matrix and at least one of first hard particles, blocky diamond particles, non-blocky diamond particles, TSP diamond, cubic boron nitride particles, and PCD compacts embedded in the first continuous metallic matrix, wherein the first hard particles are at least one of transition metal carbide particles and boron nitride particles. The second layer includes a second continuous metallic matrix and at least one of second hard particles, blocky diamond particles, non-blocky diamond particles, TSP diamond, cubic boron nitride particles, and PCD compacts, embedded in the second continuous metallic matrix, wherein the second hard particles are at least one of transition metal carbide particles and boron nitride particles. Related methods and articles of manufacture also are disclosed.

35 Claims, 3 Drawing Sheets

(51) Int. Cl.
| | |
|---|---|
| *B22F 5/10* | (2006.01) |
| *B22F 7/08* | (2006.01) |
| *B23K 9/167* | (2006.01) |
| *B23K 9/173* | (2006.01) |
| *B23K 35/02* | (2006.01) |
| *B23K 35/30* | (2006.01) |
| *B32B 15/01* | (2006.01) |
| *C22C 26/00* | (2006.01) |
| *C23C 28/02* | (2006.01) |
| *F16L 9/14* | (2006.01) |
| *F16L 57/06* | (2006.01) |

(52) U.S. Cl.
CPC ............. B23K2203/08 (2013.01); *B32B 15/01* (2013.01); *C22C 26/00* (2013.01); *C23C 28/027* (2013.01); *F16L 9/14* (2013.01); *F16L 57/06* (2013.01); *C23C 28/021* (2013.01); *C23C 28/023* (2013.01)

(56) References Cited

U.S. PATENT DOCUMENTS

| | | | |
|---|---|---|---|
| 3,762,882 A | 10/1973 | Grutza | |
| 3,936,295 A | 2/1976 | Cromwell et al. | |
| 3,980,549 A | 9/1976 | Grutza | |
| 4,105,049 A | 8/1978 | Anderson | |
| 4,181,505 A | 1/1980 | De Vries et al. | |
| 4,277,108 A | 7/1981 | Wallace | |
| 4,331,741 A | 5/1982 | Wilson | |
| 4,497,358 A | 2/1985 | Gnadig et al. | |
| 4,553,615 A | 11/1985 | Grainger | |
| 4,604,781 A | 8/1986 | Rankin, III | |
| 4,836,307 A * | 6/1989 | Keshavan et al. | 175/374 |
| 5,075,315 A | 12/1991 | Rasmussen | |
| 5,075,316 A | 12/1991 | Hubele | |
| 5,096,465 A * | 3/1992 | Chen et al. | 51/295 |
| 5,135,801 A | 8/1992 | Nystrom et al. | |
| 5,217,081 A | 6/1993 | Waldenstrom et al. | |
| 5,250,355 A | 10/1993 | Newman et al. | |
| 5,335,738 A | 8/1994 | Waldenstrom et al. | |
| 5,346,316 A | 9/1994 | Okada et al. | |
| 5,438,108 A | 8/1995 | Umemura et al. | |
| 5,447,549 A | 9/1995 | Yoshimura | |
| 5,492,186 A | 2/1996 | Overstreet et al. | |
| 5,498,142 A | 3/1996 | Mills | |
| 5,609,286 A | 3/1997 | Anthon | |
| 5,672,382 A | 9/1997 | Lux | |
| 5,712,030 A | 1/1998 | Goto et al. | |
| 5,723,177 A * | 3/1998 | Brandrup-Wognsen et al. | 427/215 |
| 5,755,298 A * | 5/1998 | Langford et al. | 175/374 |
| 5,755,299 A | 5/1998 | Langford, Jr. et al. | |
| 6,117,493 A | 9/2000 | North | |
| 6,234,261 B1 | 5/2001 | Evans et al. | |
| 6,326,582 B1 | 12/2001 | North | |
| 6,475,647 B1 | 11/2002 | Mendez Acevedo et al. | |
| 6,582,126 B2 | 6/2003 | North | |
| 6,585,864 B1 | 7/2003 | Fisher et al. | |
| 6,637,528 B2 | 10/2003 | Nishiyama et al. | |
| 6,648,068 B2 | 11/2003 | Dewey et al. | |
| 6,649,682 B1 | 11/2003 | Breton et al. | |
| 6,682,780 B2 | 1/2004 | Tzatzov et al. | |
| 6,719,074 B2 | 4/2004 | Tsuda et al. | |
| 6,725,953 B2 | 4/2004 | Truax et al. | |
| 6,772,849 B2 | 8/2004 | Oldham et al. | |
| 6,932,172 B2 | 8/2005 | Dvorachek | |
| 6,933,049 B2 | 8/2005 | Wan et al. | |
| 7,017,677 B2 | 3/2006 | Keshavan et al. | |
| 7,036,611 B2 | 5/2006 | Radford et al. | |
| 7,080,998 B2 | 7/2006 | Hall et al. | |
| 7,152,701 B2 | 12/2006 | Butland et al. | |
| 7,192,660 B2 | 3/2007 | Ruppi | |
| 7,207,401 B2 | 4/2007 | Dewey et al. | |
| 7,216,727 B2 | 5/2007 | Wardley | |
| 7,231,984 B2 | 6/2007 | Jaensch | |
| 7,234,541 B2 | 6/2007 | Scott et al. | |
| 7,234,550 B2 | 6/2007 | Azar et al. | |
| 7,267,187 B2 | 9/2007 | Kembaiyan | |
| 7,350,599 B2 | 4/2008 | Lockwood et al. | |
| 7,373,997 B2 * | 5/2008 | Kembaiyan et al. | 175/374 |
| 7,395,882 B2 | 7/2008 | Oldham et al. | |
| 7,487,849 B2 | 2/2009 | Radtke | |
| 7,497,280 B2 | 3/2009 | Brackin et al. | |
| 7,810,588 B2 | 10/2010 | McClain et al. | |
| 7,954,569 B2 | 6/2011 | Mirchandani et al. | |
| 2002/0017507 A1 * | 2/2002 | North | 219/121.45 |
| 2006/0165973 A1 * | 7/2006 | Dumm et al. | 428/323 |
| 2006/0185773 A1 | 8/2006 | Chiovelli | |
| 2007/0154738 A1 | 7/2007 | Ganguly et al. | |
| 2009/0032501 A1 | 2/2009 | Swingley et al. | |
| 2010/0101866 A1 * | 4/2010 | Bird | 175/374 |

FOREIGN PATENT DOCUMENTS

| | | |
|---|---|---|
| CA | 1250156 A1 | 2/1989 |
| CA | 2022065 A1 | 2/1991 |
| CA | 2120332 A1 | 6/1993 |
| CA | 2107004 C | 5/1996 |
| CA | 2228398 A1 | 2/1997 |
| CA | 2198985 A1 | 9/1998 |
| CA | 2108274 C | 7/2000 |
| CA | 2201969 C | 2/2003 |
| CA | 2213169 C | 3/2005 |
| CA | 2498073 A1 | 8/2006 |
| CA | 2556132 A1 | 2/2007 |
| CA | 2570937 A1 | 6/2007 |
| CA | 2357407 C | 1/2008 |

OTHER PUBLICATIONS

SM Specialty Metals, "Tungchip Dispenser", printed from http://www.hardmetalindustries.com.au/files/Tungchip_Dispenser.pdf (undated).

Dynalloy Industries, "G.M.A.C.E. Delivery Systems—Gas. Metal. Arc. Carbide. Embedding", printed from http://www.dynalloyinc.com/gmace.htm (dated 2003).

Alloys International (Australasia) Pty. Ltd., "The Tungsten Carbide Vibratory Feeder System", printed from http://www.alloysint.com.au/pdf/vibratory_feeder_booklet.pdf (undated).

Dynalloy Industries, "Hardhead Technology, Tungsten Carbide Pellets", printed from http://www.dynalloyinc.com/tungcarb_pellets.htm (dated 2003).

Lincoln Electric, "MIG Carbide Vibratory Feeder Assembly" (undated).

Wearshield Hardfacing Electrodes, "Tungsten Carbide Products" (undated).

"The Best in Hardfacing", Postle Industries, Inc. (undated).

Postle Industries, Inc., "Postalloy PS-98 Tungsten Matrix Alloy" (undated).

Postle Industries, Inc., "Data Sheet—Postalloy 299-SPL" (undated).
Postle Industries, Inc., "Data Sheet—Postalloy CP 63070" (undated).
Postle Industries, Inc., "Data Sheet—Postalloy 14 TC" (undated).
Postle Industries, Inc., "Data Sheet—Postalloy PS-98" (undated).
Industrial Renewal Services, "Steel BOF (Basic Oxygen Furnace) & BOP (Basic Oxygen Process) Hoods", printed on Nov. 8, 2007 from http://www.sriclad.com/steel-BOF-BOP-hoods-welding.html.
Universal Weld Overlays Inc., "Products", printed Nov. 8, 2007 from http://www.universalweld.com/products.htm.

* cited by examiner

MULTILAYER OVERLAYS AND METHODS FOR APPLYING MULTILAYER OVERLAYS

BACKGROUND OF THE TECHNOLOGY

1. Field of Technology

The present disclosure relates to multilayer overlays providing corrosion, erosion and/or abrasion resistance to surfaces of articles of manufacture. The present disclosure also relates to methods for applying multilayer overlays to article surfaces, wherein the overlays provide resistance to corrosion, erosion, and/or abrasion.

2. Description of the Background of the Technology

For many years, attempts have been made to reduce wear experienced by pipes, valves, gaskets, and other material flow parts in energy systems, refineries, coke plants, and chemical production facilities, as well as by components that handle or contact abrasive materials. Examples of such parts include pipe, valves, and other parts subjected to a flow of highly abrasive oil sands in energy production systems, or subjected to a flow of highly corrosive chemicals in chemical production plants. Other examples of such parts include excavating bucket teeth, grader blades, and hammers. The conditions promoting wear of such parts can be abrasive, erosive, and/or chemical in nature, and can be extremely aggressive. The nature of material flow parts, for example, often makes servicing and replacing them difficult, and the process downtime and man-hours associated with repairing or replacing parts in these systems can be very costly. Therefore, substantial efforts have been made to produce material flow parts for these applications that can better withstand the aggressive corrosive, erosive, and/or abrasive wear conditions to which the parts are subjected.

Materials including hard particles in a metallic matrix have been proposed for reducing the wear of surfaces of metallic parts. For example, Canadian patent application no. 2,498,073 describes a wear resistant material composed of boron carbide particles in a metal matrix, wherein the material is applied to the interior surface of a fluid conducting part. Also, Canadian patent application no. 1,018,474 describes a wear resistant material composed of conventional synthetic industrial diamond in an electroplated nickel matrix that is applied to a surface of a part to inhibit wear. The hard carbide and diamond particles in these prior art material provide wear resistance, and the matrix material provides toughness and allows the wear resistant particles to be securely associated with the surfaces to be protected from wear.

Diamond is the hardest and most chemically inert material known and has been used in some applications taking advantage of its substantial resistance to wear. Industrial diamond and tungsten carbide particles have been used in the superabrasives industry for many years. For example, combinations of tungsten carbide and conventional grit-size industrial diamond particles have been embedded in a metallic matrix such as cobalt or iron to provide materials for grinding wheels and saw blades. As is known in the art, "industrial diamond" refers to small diamond particles that are often synthetic, have no value as gemstones, and are used in the cutting tool, abrasives, construction, and other industries. The application of conventional industrial diamond to provide wear resistance has been extended to the fabrication of highly wear resistant parts composed of a polycrystalline diamond layer bonded to a tungsten carbide matrix material substrate.

Mined diamond has been available for industrial use since the early 1900's and became a material of strategic importance in the 1940's. Given the intrinsic value of diamond, efforts have been made for over 200 years to synthetically produce diamond. In 1797, Tennant demonstrated that diamond is a high density form of carbon, and it was postulated that subjecting common forms of carbon to pressure might produce diamond. Over 100 years ago, Hannay reported successfully producing diamond by sealing organic material and lithium into tubes and heating them to very high temperature. In the late 19th century, Moissan used the known solubility of carbon in solid iron to attempt diamond synthesis by quenching a high-temperature carbon/iron solution in water. The pressure generated by contraction of the iron on cooling was claimed to produce diamond. Although many additional attempts to produce diamond in the laboratory were made over the years, it is believed that until the 1950s those attempts were unsuccessful given the intrinsic difficulty of replicating the conditions under which diamond forms naturally. First, extremely high pressure is needed to achieve the compact, strongly bonded structure of diamond. Second, even when the extreme pressure necessary is achieved, very high temperature also is required so that the conversion to diamond occurs at a useful rate. Third, even when the pressure and temperature conditions are achieved, only very small diamond grains are produced. Achieving a large single crystal diamond requires meeting even further, more extensive conditions.

By 1941, the General Electric, Carborundum, and Norton companies and P. S. Bridgeman, a well known researcher in the field of high pressure, agreed to jointly investigate diamond synthesis, but the effort was discontinued prematurely due to the war. The parties did report some success in that they claimed to have subjected graphite at almost half a million psi to a temperature of 3000° C. for a few seconds through a thermite reaction. In 1951, General Electric formed a high pressure diamond group that came to include researchers H. A. Nerad, F. P. Bundy, H. M. Strong, H. T. Hall, R. H. Wentorf, J. E. Cheney, and H. P. Bovenkerk. On Dec. 16, 1954, Hall successfully obtained synthetic diamonds, and he duplicated his success in several runs over the next two weeks. During the succeeding few months, the GE group worked out the details of Hall's synthesis process. The first public announcement of success occurred in 1955, listing the names of Hall, Strong, and Wentorf. At the same time, both the DeBeers company and researchers in the USSR also reported the successful synthesis of diamond, although the initial U.S. patent on a process for producing synthetic diamond was awarded to General Electric.

Many additional processes for preparing synthetic diamond have been developed since the successes of General Electric and Hall. In certain of these processes, the nucleation and growth of diamond crystals is achieved under relatively low pressure and temperature conditions. The production of synthetic industrial diamond has now advanced to the point that the quantity of synthetic industrial diamond produced each year far exceeds the amount of mined industrial diamond. General Electric exited the commercial synthetic diamond business in 2003, when its superabrasives business was sold and began operations as Diamond Innovations. Diamond Innovations, Element Six, and Iljin Diamond, along with a number of smaller producers, make up the current primary players in the industrial diamond industry. The successful and large-scale production of synthetic diamond has made the material generally available at a cost justifying its use in industrial and other applications.

Given the hardness and wear resistance of industrial diamond and its present commercial availability, it would be advantageous to provide materials including industrial diamond that may be applied to surfaces of metallic parts to improve resistance to corrosion, erosion, and abrasion.

SUMMARY

One non-limiting aspect according to the present disclosure is directed to a wear resistant multilayer overlay. The wear resistant multilayer overlay includes a first or inner layer including a first continuous metallic matrix and at least one of first hard particles, blocky diamond particles, non-blocky diamond particles, TSP diamond, cubic boron nitride particles, and PCD compacts embedded in the first continuous metallic matrix. The first hard particles are at least one of transition metal carbide particles and cubic boron nitride particles. The wear resistant multilayer overlay also includes a second or outer layer that is metallurgically bonded to at least a portion of the first or inner layer. The second or outer layer includes a second continuous metallic matrix, and at least one of second hard particles, blocky diamond particles, non-blocky diamond particles, TSP diamond, cubic boron nitride particles, and PCD compacts embedded in the second continuous metallic matrix. The second hard particles are at least one of transition metal carbide particles and boron nitride particles.

Another non-limiting aspect according to the present disclosure is directed to a wear resistant multilayer overlay including a first or inner layer comprising a first continuous metallic matrix and at least one of first hard particles, blocky diamond particles, non-blocky diamond particles, TSP diamond, cubic boron nitride particles, and PCD compacts embedded therein. The first hard particles are at least one of transition metal carbide particles and boron nitride particles, and the at least one of first hard particles, blocky diamond particles, non-blocky diamond particles, TSP diamond, cubic boron nitride particles, and PCD compacts are dispersed and embedded in the first continuous metallic matrix in a concentration of 25 to 85 volume percent based on the total volume of the first layer. The wear resistant multilayer overlay also includes a second or outer layer metallurgically bonded to at least a portion of the first or inner layer. The second or outer layer includes at least one of second hard particles, blocky diamond particles, non-blocky diamond particles, TSP diamond, cubic boron nitride particles, and PCD compacts embedded in the second continuous metallic matrix. The second hard particles are at least one of transition metal carbide particles and boron nitride particles. Preferably, the outer layer includes second hard particles and at least 50 volume percent of the second hard particles embedded in the second continuous metallic matrix have a mesh size of –10 to +400. Also, preferably at least 50 volume percent of any uncoated blocky diamond particles and TSP diamond embedded in the second metallic matrix have a toughness index of at least 35, and preferably at least 50. The total concentration of second hard particles, blocky diamond particles, non-blocky diamond particles, TSP diamond, cubic boron nitride particles, and PCD compacts embedded in the second or outer layer is 10 to 80 volume percent, based on the total volume of the second or outer layer. Also, the total concentration of any blocky diamond particles, non-blocky diamond particles, TSP diamond, cubic boron nitride particles, and PCD compacts embedded in the second or outer layer preferably is 0.5 to 20 volume percent based on the total volume of the second or outer layer, and at least 50 volume percent of the total volume of any blocky diamond particles, non-blocky diamond particles, TSP diamond, cubic boron nitride particles, and PCD compacts embedded in the second continuous metallic matrix preferably has a size in the range of –10 mesh to 0.01 micron.

A further non-limiting aspect according to the present disclosure is directed to an article of manufacture including a wear resistant multilayer overlay according to the present disclosure disposed on at least a region of a surface of the article. Certain non-limiting embodiments of the article of manufacture may be selected from a pipe, a valve, a valve part, a flange, a drill string casing stabilizer, a pump part, a hammer, a drag line tooth, an excavating tooth, an excavating bucket part, a road scraper part, a mixing blade, a drill, a cutter head, a cutter tooth, and a container. One particular non-limiting embodiment of an article of manufacture according to the present disclosure is a pipe for transporting oil sands, wherein a wear resistant multilayer overlay according to the present disclosure is disposed on at least a region of an interior surface of the pipe that is contacted by oil sands being transported through the pipe.

An additional non-limiting aspect according to the present disclosure is directed to a method of improving the resistance of a metallic surface to at least one of erosion, corrosion, and abrasion by providing a wear resistant multilayer overlay according to the present disclosure on at least a region of the metallic surface. The method includes providing a first or inner layer on at least a region of the metallic surface, and providing a second or outer layer metallurgically bonded to at least a region of the first or inner layer. The first or inner layer comprises at least one of first hard particles, blocky diamond particles, non-blocky diamond particles, TSP diamond, cubic boron nitride particles, and PCD compacts dispersed and embedded in a first continuous metallic matrix, wherein the first hard particles are at least one of transition metal carbide particles and boron nitride particles. The second or outer layer includes at least one of second hard particles, blocky diamond particles, non-blocky diamond particles, TSP diamond, cubic boron nitride particles, and PCD compacts dispersed and embedded in the second continuous metallic matrix. The second hard particles are at least one of transition metal carbide particles and boron nitride particles.

In certain non-limiting embodiments of a method according to the present disclosure, a first or inner layer and a second or outer layer according to the present disclosure are deposited by a welding process such as, for example, a process selected from MIG welding, TIG welding, and plasma welding. Also, in certain embodiments of a method according to the present disclosure, the method provides a wear resistant multilayer overlay on at least a region of a metallic surface of an article of manufacture selected from a pipe, a valve, a valve part, a flange, a drill string casing stabilizer, a pump part, a hammer, a drag line tooth, an excavating tooth, an excavating bucket part, a road scraper part, a mixing blade, a drill, a cutter head, a cutter tooth, and a container.

BRIEF DESCRIPTION OF THE DRAWINGS

Features and advantages of certain non-limiting embodiments of the overlays, methods, and articles described herein may be better understood by reference to the accompanying drawings in which.

Figure 1:
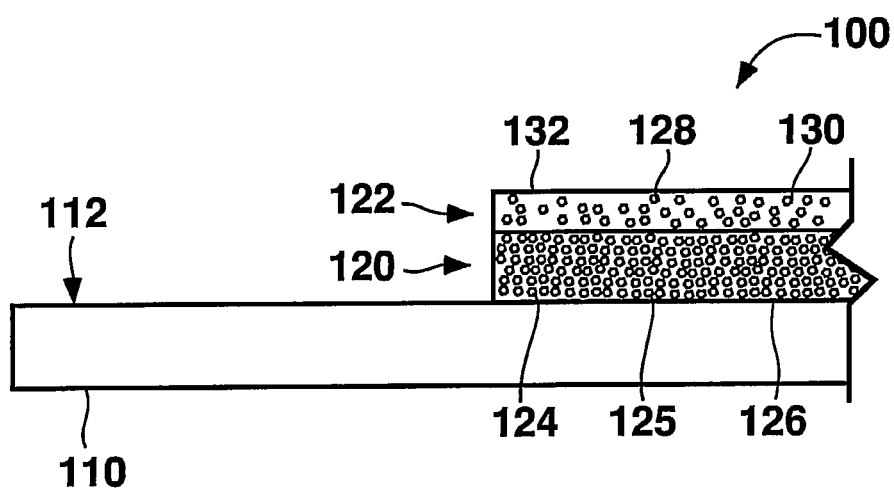
FIG. 1 is a schematic cross-sectional illustration of a non-limiting embodiment of a wear resistant multilayer overlay according to the present disclosure.

The reader will appreciate the foregoing details, as well as others, upon considering the following detailed description of certain non-limiting embodiments of overlays, methods, and articles according to the present disclosure. The reader also may comprehend certain of such additional details upon carrying out or using the overlays, methods, and articles described herein.

DETAILED DESCRIPTION OF CERTAIN NON-LIMITING EMBODIMENTS

In the present description of non-limiting embodiments, other than in the operating examples or where otherwise indicated, all numbers expressing quantities or characteristics of ingredients and products, processing conditions, and the like are to be understood as being modified in all instances by the term "about". Accordingly, unless indicated to the contrary, any numerical parameters set forth in the following description are approximations that may vary depending upon the desired properties one seeks to obtain in the present invention. At the very least, and not as an attempt to limit the application of the doctrine of equivalents to the scope of the claims, each numerical parameter should at least be construed in light of the number of reported significant digits and by applying ordinary rounding techniques.

Any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as set forth herein supersedes any conflicting material incorporated herein by reference. Any material, or portion thereof, that is said to be incorporated by reference herein, but which conflicts with existing definitions, statements, or other disclosure material set forth herein is only incorporated to the extent that no conflict arises between that incorporated material and the existing disclosure material.

One aspect of the present disclosure is directed to a wear resistant multilayer overlay. As discussed below, the overlay according to the present disclosure resists corrosion, erosion, and/or abrasion and may be applied to metallic surfaces of articles subjected to chemically corrosive, erosive, and/or physically abrasive conditions. These conditions are encountered, for example, by the following parts: parts for conducting fluids, including corrosive fluid materials such as hot, caustic materials; parts for conducting, transporting, or holding slag or coke particles; parts for conducting liquids in oil producing facilities; parts for conducting physically abrasive materials such as, for example, tar sands and oil sands; parts of crushing, grinding, excavating, and/or grading apparatuses; and parts of material transport apparatuses for transporting or conveying abrasive materials.

As used herein in the following description of the invention and in the appended claims, the following terms are understood to have the following meanings:

The words "and/or" mean that either of the items preceding and following the words term may be present alone, or both of the items may be present together.

"Blocky diamond particles" has the meaning provided below.

"Cubic boron nitride", which also is referred to as "CBN", is a manufactured product that does not occur in nature and is produced in a process similar to that used to produce industrial diamond. In the process, hexagonal boron nitride powder is subjected to ultrahigh pressure and high temperature and is converted to the cubic form. Cubic boron nitride is the second hardest known substance.

"Mesh size" refers to the US Standard Sieve Series, which corresponds to the number of wires per inch of screen used to assess the size of the material. As such, larger numbers correspond to smaller wire spacing on the mesh. A mesh size range such may be represented as, for example, "−10 to +400 mesh", which also may be presented herein in the format "10/400". A sample having a mesh size range of 10/400 means that a 10 mesh screen is the largest screen size through which all of the sample theoretically passes through, and a 400 mesh screen is the largest screen through which none of the sample theoretically passes through, although certain allowable maximum percentages of oversized and undersized particles are set forth in ANSI specifications. Those having ordinary skill can readily determine the mesh size of a particular sample using conventional techniques and equipment. With regard to the present invention, the mesh size of a diamond sample is determined pursuant to specification ANSI B74.16-2002, "Checking the Size of Diamond Abrasive Grain", for mesh sizes 8/10 through 325/400, and pursuant to specification ANSI B74.20-1997, "Grading of Diamond Powder in Sub-Sieve Sizes", for micron powders of sizes 0-1 micron through 54-80 micron.

"Metallic" means metal-containing and encompasses, for example, metals and metal alloys.

"Multilayer" means including two or more layers.

"Overlay" means a metallic structure of at least 3 mm that is molecularly bonded to a base material.

A "polycrystalline diamond compact" or "PCD compact" refers to a compact composed of a layer of polycrystalline diamond on a tungsten carbide substrate. Polycrystalline diamond compacts are synthesized by agglomeration of diamond micropowder and a hard alloy substrate under conditions of ultrahigh pressure and high temperature.

"TSP diamond" refers to thermally stable polycrystalline diamond, which comprises synthetic diamond grown in a cell with the aid of a metallic catalyst, sintered together under high pressure and temperature, and then leached to remove residual metal. TSP diamond is manufactured in a variety of shapes (for example, cubes and spheres) and sizes, and is available commercially from, for example, Element Six (New York, N.Y.) and Diamond Innovations (Worthington, Ohio).

"Wear resistant" is the characteristic of having relatively substantial resistance to wear from corrosion, erosion, and/or abrasion.

One non-limiting embodiment of a wear resistant multilayer overlayer according to the present disclosure is described in conjunction with FIG. 1. Multilayer overlay 100 includes two distinct layers and is applied to a base material 110 to protect all or a region of the surface 112 of the base material 110 from corrosive, erosive, and/or abrasive conditions. The base material 110 and, consequently, the surface 112 may be, for example, a metal or a metal alloy. Non-limiting examples of possible base materials include carbon steel, stainless steel, and nickel and cobalt base superalloys. The portion of the base material 110 shown in FIG. 1 may be representative of a portion or region of, for example, a pipe, a valve, a valve part, a flange, a drill string casing stabilizer, a pump part, a hammer, a drag line tooth, an excavating tooth, an excavating bucket part, a road scraper part, a mixing blade, a drill, a cutter head, a cutter tooth, or a container.

Multilayer overlay 100 includes an inner (first) layer 120 and an outer (second) layer 122. The outer layer 122 is disposed on at least a region of the inner layer 120. Although the embodiment illustrated in FIG. 1 includes only inner and outer layers 120 and 122, it will be understood that certain other embodiments of the wear resistant multilayer overlay according to the present disclosure may include one or more additional layers disposed exterior to the outer layer 122. The inner layer 120 may include one or more of first hard particles, blocky diamond particles, non-blocky diamond particles, TSP diamond, cubic boron nitride particles, and PCD compacts. In multilayer overlay 100, for example, inner layer 120 is a layer including first hard particles 124 and at least one of blocky diamond particles, non-blocky diamond particles, TSP diamond, cubic boron nitride particles, and PCD compacts 125 dispersed and embedded in a first continuous metallic matrix 126. The first hard particles 124 may include one or more of transition metal carbide particles and boron nitride particles. Examples of possible transition metal carbide particles include particles of carbides of one or more of titanium, vanadium, chromium, manganese, iron, cobalt, nickel, copper, zinc, yttrium, zirconium, niobium, molybdenum, ruthenium, rhodium, palladium, silver, cadmium, hafnium, tantalum, and tungsten.

The first continuous metallic matrix is a metal or metal alloy, and non-limiting examples of possible metal alloys from which the first metallic matrix is comprised include carbon steel, stainless steel, and nickel-chromium superalloys. If the surface on which the inner layer is disposed is composed of carbon steel, then the first continuous metallic matrix preferably also is a carbon steel. If the surface on which the inner layer is disposed is composed of stainless steel, then the first continuous metallic matrix preferably also is a stainless steel.

Again referring to FIG. 1, outer layer 122 is disposed on and metallurgically bonded to at least a region or portion of inner layer 120. Outer layer 122 includes one or more of second hard particles, blocky diamond particles, non-blocky diamond particles, TSP diamond, cubic boron nitride particles, and PCD compacts. In multilayer overlay 100, for example, second hard particles 128 in the form of transition metal carbide particles, and at least one of blocky diamond particles, non-blocky diamond particles, TSP diamond, cubic boron nitride particles, and PCD compacts 130 are dispersed and embedded in a second continuous metallic matrix 132. Examples of possible transition metal carbide particles include particles of carbides of one or more of titanium, vanadium, chromium, manganese, iron, cobalt, nickel, copper, zinc, yttrium, zirconium, niobium, molybdenum, ruthenium, rhodium, palladium, silver, cadmium, hafnium, tantalum, and tungsten.

The second continuous metallic matrix also is a metal or metal alloy. Similar to the first continuous metallic matrix, non-limiting examples of possible metal alloys from which the second continuous metallic matrix 132 is comprised include carbon steel, stainless steel, and nickel-chromium superalloys. If the first continuous metallic matrix is a carbon steel, then the second continuous metallic matrix preferably also is a carbon steel. If the first continuous metallic matrix is a stainless steel, then the second continuous metallic matrix preferably also is a stainless steel.

It will be understood that in certain non-limiting embodiments of an overlayer according to the present disclosure, the inner layer 120 and the outer layer 122 of the multilayer overlay 100 each include a discontinuous phase of hard particles (for example, transition metal carbides, boron nitride particles, cubic boron nitride particles, blocky diamond particles, non-blocky diamond particles, and/or TSP diamond) dispersed and embedded in a continuous matrix of a metal or metal alloy.

In certain non-limiting embodiments, the wear resistant multilayer overlay 100 includes an inner layer 120 having a thickness of 3 to 15 mm. Also, in certain non-limiting embodiments, the wear resistant multilayer overlay 100 includes an outer layer 122 having a thickness of 3 to 8 mm. In other non-limiting embodiments, the overlay 100 includes both an inner layer 120 having a thickness of 3 to 15 mm, and an outer layer 122 having a thickness of 3 to 8 mm. It will be understood, however, that the inner layer, outer layer, and any additional layer or layers of the wear resistant multilayer overlays according to the present disclosure may have any thickness suitable for the desired application, so long as the entire overlayer thickness is at least 3 mm. For example, layer thicknesses may be greater when the overlay is intended for use under extremely corrosive, erosive, and/or abrasive conditions. Thicker layers provide overlays allowing for a longer service life of the treated part before it is necessary to re-apply the overlay or replace the treated part.

The identity, concentration, and size of the first hard particles 124 and any blocky diamond particles, non-blocky diamond particles, TSP diamond, cubic boron nitride particles, and PCD compacts 125 embedded in the inner layer 120 are selected to provide acceptable wear resistance to the inner layer 120 in the event that the outer layer wears away or is absent at one or more regions of the overlay 100. In addition, a certain concentration of the first hard particles 124, if present in the overlay, may be embedded in both the inner layer 120 and the outer layer 122, across the interface between the layers, thereby enhancing the strength of the bond between the inner layer 120 and the outer layer 122 to better resist deterioration of the overlay 100. In certain embodiments, the total concentration of first hard particles 124 and blocky diamond particles, non-blocky diamond particles, TSP diamond, cubic boron nitride particles, and PCD compacts 125 embedded in the first continuous metallic matrix 126 is 25 to 85 volume percent, more preferably is 25 to 75 volume percent, and even more preferably is 25 to 70 volume percent, each based on the total volume of the inner layer 120. In certain other embodiments, the total concentration of first hard particles 124 and blocky diamond particles, non-blocky diamond particles, TSP diamond, cubic boron nitride particles, and PCD compacts 125 embedded in the first continuous metallic matrix 126 is at least 30 volume percent based on the total volume of the inner layer 120. Also, in certain embodiments, the overlay includes first hard particles 124 and at least a portion of the first hard particles 124 embedded in the first continuous metallic matrix 126 are tungsten carbide particles.

As noted, in certain non-limiting embodiments, the inner layer 120 may include blocky diamond particles and/or non-blocky diamond particles and/or TSP diamond and/or cubic boron nitride particles and/or PCD compacts. In such embodiments, the total concentration of blocky diamond particles, non-blocky diamond particles, TSP diamond, cubic boron nitride particles, and PCD compacts 125 embedded in the inner layer 120 may be up to 20 volume percent based on the total volume of the inner layer 120. In certain other embodiments, the total concentration of blocky diamond particles, non-blocky diamond particles, TSP diamond, cubic boron nitride particles, and PCD compacts 125 embedded in the inner layer 120 may be 0.5 to 20 volume percent based on the total volume of the inner layer 120.

In certain non-limiting embodiments of the multilayer overlay 100, at least 50 volume percent, and more preferably at least 80 volume percent, of any first hard particles 124 dispersed in the first continuous metallic matrix 126 of the inner layer 120 have a mesh size in the range of −10 to +400 mesh. In a more preferred non-limiting embodiment, at least 50 volume percent of any first hard particles 124 dispersed in the first continuous metallic matrix 126 of the inner layer 120 have a mesh size in the range of −30 to +400 mesh. In certain non-limiting embodiments, the first hard particles 124 included in the inner layer 120 include tungsten carbide particles having a mesh size of 14/20, 20/30, 30/40, or 40/50 mesh.

Also, in certain non-limiting embodiments of the multilayer overlay 100, at least 50 percent of the total volume of any blocky diamond particles, non-blocky diamond particles, TSP diamond, cubic boron nitride particles, and PCD compacts dispersed in the first continuous metallic matrix 126 of the inner layer 120 have a size in the range of −10 mesh to +0.01 micron (linear diameter). As is known in the art, TSP diamond and PCD compacts are available as formed structures in a variety of shapes. Any suitable shape of TSP diamond, cubic boron nitride particles, and PCD compacts may be used in the overlays of the present disclosure. With regard to TSP diamond, cubic and spherical shapes are preferred. In certain non-limiting embodiments, the inner layer 120 includes TSP diamond and/or cubic boron nitride particles and/or PCD compacts having a mesh size of 10/14, 14/20, 20/30, or 30/40 mesh. If the inner layer 120 includes blocky diamond particles and/or non-blocky diamond particles, the mesh sizes of the particles may be, for example, 30/40, 40/50, 50/60, 60/80, 80/100, 100/120, 120/140, 140/170, 170/200, 200/230, 230/270, 270/325, or 325/400 mesh.

As is known to those having ordinary skill in the field of industrial diamond manufacture, blocky diamond particles refers specifically to single crystal diamond particles having a well structured and generally uniform cuboidal or cubo-octohedral crystal shape. Also, as used herein, blocky diamond particles consist of single crystals have a planar mode aspect ratio in the range of 1.5:1 to 1:1 (inclusive) and, thus, have or approximate a cuboidal or "blocky" crystal shape. The present inventor observed that blocky diamond particles have significantly higher strength and toughness than non-blocky diamond particles when the diamond particles are included in the dispersed (discontinuous) phase of a metallic wear resistant overlay. Also, in certain non-limiting embodiment described herein, part or all of the content of uncoated blocky diamond particles, cubic boron nitride particles, and TSP diamond have a toughness index of at least 35, and preferably at least 50, as evaluated using a conventional friability test known in the industry, in which a specially designed capsule is loaded with 2 carats of a particulate sample and a number of ¼ inch stainless steel ball bearings and is reciprocated along a fixed path at a fixed rate for a fixed time. The percentage of the sample that is left on a screen of selected mesh size after the testing is conducted is designated the "toughness index". Thus, a higher toughness index reflects that a greater percentage of the particulate diamond sample remained on the screen. A higher toughness index corresponds to a tougher, less friable sample. Equipment for determining the toughness index is available from, for example, American Superabrasives Corp., Shrewsbury, N.J. Furthermore, blocky diamond particles used in the overlays according to the present disclosure preferably have bulk density of 1.96 to 2.08 as determined pursuant to specification ANSI B74.4-1992 (R 2002), "Bulk Density of Abrasive Grains".

The present inventor also observed that blocky diamond particles have a significantly lower propensity to dislodge from the metallic matrix (i.e., erode or spall) than non-blocky diamond particles when incorporated in a multilayer metallic overlay according to the present disclosure. In other words, the present inventor determined that blocky diamond particles are significantly less likely to fracture or spall under strain than non-blocky diamond particles when included in the dispersed phase of wear resistant overlays according to the present disclosure. The significantly reduced propensity of blocky diamond particles to fracture or spall when incorporated in such overlays was observed to significantly improve the integrity and substantially enhance the wear resistance and service life of such overlays relative to materials including conventional industrial diamond. Conventional industrial diamond is typically non-blocky in form and does not have the characteristics discussed herein for blocky diamond particles. To the inventor's knowledge, a wear resistant overlay comprising blocky diamond particles in a metallic matrix material has not been available and has not been proposed previously.

As discussed above, in certain non-limiting embodiments of the multilayer overlay 100, the outer layer 122 includes second hard particles 128 and at least one of blocky diamond particles, non-blocky diamond particles, TSP diamond, cubic boron nitride particles, and PCD compacts 130 dispersed and embedded in the second continuous metallic matrix material 132. The identity, concentration, and size of the second hard particles 128 embedded in the outer layer 122 are selected to provide acceptable wear resistance to the outer layer 122. In certain embodiments, the combined concentration of second hard particles 128, blocky diamond particles, non-blocky diamond particles, TSP diamond, cubic boron nitride particles, and PCD compacts 130 embedded in the second continuous metallic matrix 132 is 10 to 85 volume percent, more preferably is 10 to 50 volume percent, and even more preferably is 25 to 50 volume percent, each based on the total volume of the outer layer 122.

In certain non-limiting embodiments of the multilayer overlay 100, at least 50 volume percent, and more preferably at least 80 volume percent, of any second hard particles 128 dispersed in the second continuous metallic matrix 132 of the outer layer 122 have a mesh size in the range of −10 to +400 mesh. In a more preferred non-limiting embodiment, at least 50 volume percent of any second hard particles 128 dispersed in the second continuous metallic matrix 132 of the outer layer 122 have a mesh size in the range of −30 to +400 mesh. Also, in certain non-limiting embodiments of the multilayer overlay 100, at least 50 percent of the total volume of blocky diamond particles, non-blocky diamond particles, TSP diamond, cubic boron nitride particles, and PCD compacts dispersed in the second continuous metallic matrix 132 of the outer layer 122 have a size in the range of −10 mesh to +0.01 micron (linear diameter). As is known in the art, TSP diamond, cubic boron nitride, and PCD compacts are available as formed structures that may have any of a variety of shapes. As discussed above, any suitable shape of TSP diamond, cubic boron nitride particles, and PCD compacts may be used. With regard to TSP diamond, cubic and spherical shapes are preferred. In certain additional non-limiting embodiments of the multilayer overlay 100, the outer layer 122 includes one or more of blocky diamond, non-blocky diamond, TSP diamond, cubic boron nitride particles, and PCS compacts in any of the mesh sizes included in the inner layer 120, as discussed above.

Optionally, a portion or all of the diamond particles, cubic boron nitride particles, and TSP diamond included in the inner layer 120 and outer layer 122 of the multilayer overlay 100 may be coated with at least one metal or alloy to improve bond strength with the continuous metallic matrix in which they are dispersed. In one non-limiting embodiment of the multilayer overlay 100, at least a portion of the blocky diamond particles, non-blocky diamond particles, TSP diamond, cubic boron nitride particles, and/or PCD compacts in at least one of the inner layer 120 and outer layer 122 are coated with titanium, a titanium alloy, nickel, or nickel/chromium to improve bond strength with the continuous metallic matrix in which they are dispersed.

A non-limiting example of a system and method for applying the wear resistant multilayer overlay according to the present disclosure is described below in conjunction with FIG. 2. In that non-limiting example, both first and second continuous metallic matrices are weld deposits deposited using, for example, MIG, TIG, or plasma welding techniques, and that may be selected from carbon steel, stainless steel, and nickel-base superalloys.

In one particular non-limiting embodiment according to the present disclosure, the wear resistant multilayer overlay according to the present disclosure includes an inner (first) layer comprising 25 to 85 volume percent first hard particles (based on the volume of the inner layer 120) dispersed and embedded in a first continuous metallic matrix. The first hard particles may be at least one of transition metal carbide particles and boron nitride particles, and the first continuous metallic matrix is deposited as a weld deposit. An outer (second) layer is metallurgically bonded to at least a portion of the inner layer and comprises second hard particles and at least one of blocky diamond particles, cubic boron nitride particles, and TSP diamond, which are dispersed and embedded in a second continuous metallic matrix that also is deposited as a weld deposit. At least 50 volume percent of the second hard particles 124 embedded in the second continuous metallic matrix have a mesh size within the range of −10 mesh to +400 mesh, and at least 50 volume percent of the total volume of blocky diamond particles, cubic boron nitride particles, and TSP diamond embedded in the second continuous metallic matrix has a size within the range of −10 mesh to 0.01 micron. Preferably, at least 50 volume percent of the total volume of uncoated blocky diamond particles, cubic boron nitride particles, and TSP diamond embedded in the second metallic matrix have a toughness index of at least 35, and preferably at least 50. The total concentration of second hard particles, blocky diamond particles, cubic boron nitride particles, and TSP diamond embedded in the outer layer 122 is 10 to 50 volume percent based on the total volume of the outer layer, and the total concentration of blocky diamond particles, cubic boron nitride particles, and TSP diamond embedded in the outer layer 122 is 0.5 to 20 volume percent based on the total volume of the outer layer 122. The first and second continuous metallic matrices are weld deposits deposited by one of a MIG, TIG, and plasma welding technique, and the weld deposits are selected from carbon steel, stainless steel, and nickel-base superalloys.

Again referring to FIG. 1, the multilayer overlay 100 and other multilayer overlays according to the present disclosure may be applied to a base material using an apparatus including a welding device and a conventional vibratory feed mechanism for metering particulate materials to the weld deposit as it is deposited. One possible non-limiting system for applying a wear resistant multilayer overlay according to the present disclosure is illustrated in FIG. 2, wherein apparatus 200 includes MIG welding nozzle 210 and vibratory feed device 212. Welding nozzle 210 is associated with a welding device (other parts of the welding device are not shown in FIG. 2) and deposits a metal or metal alloy weld deposit on surface 218 of base material 220 as the metallic matrix material 214. Vibratory feed device 212 meters particulate material including metal carbide, boron nitride, blocky diamond, non-blocky diamond, TSP diamond, cubic boron nitride particles, and/or PCD compacts 216. Although a MIG welding system is preferred, other welding systems, such as, for example, plasma and TIG welding systems, may be utilized. Welding nozzle 210 deposits the metal or metal alloy matrix material 214 in a molten form on surface 218. The particulate material 216 is fed to the surface 218 simultaneous with the matrix material 214 and becomes dispersed and embedded within the matrix material 214. Given that metal carbide, boron nitride, cubic boron nitride, and the various diamond materials have very high melting temperatures, they remain in solid form and do not melt when contacting the molten matrix material 210.

The matrix material 214 applied to surface 218 to form the first layer 320 of the multilayer overlay is a material that is compatible with the base material 220. As used in that context, a "compatible" material is one that forms a suitably strong metallurgical bond with the base material and does not form alloys or solid mixtures with the base material that exhibit unacceptable mechanical characteristics, corrosion, or other properties in the context of the particular application. For example, the matrix material may be selected from carbon steel, stainless steel, Inconel alloys (a family of austenitic nickel-chromium-based superalloys), or another suitable metal or metallic alloy that will produce an acceptable layer when combined with the specific particulate material dispersed and embedded within it. Those having ordinary skill will be able to select a suitable matrix material for the inner layer 230 that is compatible with the base material 220 and that will form a suitable layer with the particulate material 216.

Vibratory feed device 212 may have a conventional design. As shown in FIG. 2, an embodiment of vibratory feed device 212 includes inverted conical hopper 240 in which particulate material 216 is disposed. Particulate material 216 passes to feeder trough 242 by action of gravity. Vibratory drive motor 244 vibrates feeder trough 242 and causes particulate material 216 to enter metering nozzle 246, pass through metering tube 248, and drop onto and disperse within molten matrix material 214 on surface 218. The guide end 249 of metering tube 248 is secured to welding nozzle 210 by bracket 250 so that particulate material 216 is deposited immediately after molten matrix material 214 is deposited on surface 218. Although FIG. 2 depicts a particular design of vibratory feed device to meter particulate material 216, it will be understood that any suitable vibratory feed device may be used and, more generally, that any method, system, or device for suitably metering particulate material to a surface may be used. The inner layer 230 is applied to surface 218 by translating the apparatus 200 and/or the base material 220 so that relative motion occurs. The apparatus 200 deposits a strip or band of the inner layer 230 of the multilayer overlay along the surface 218, covering a width of the surface dependent on various parameters including, for example, the design of the weld nozzle 210 and other parameters of the welding process. Suitable relative motion of the apparatus 200 and the base material 220 in a pattern wherein adjacent strips or bands of the first layer 230 are deposited on the surface 218 may be used to cover a target region of the surface 218.

The vibratory feed device 212 meters the particulate material 216 to the surface 218 at a rate (volume/time) to provide the desired saturation level of the matrix material 214. As is conventional with vibratory feeder devices, the flow of particulate material from the feeder device can be controlled by adjusting the degree of vibrational energy applied to the particulate material. The molten matrix material 214, however, will only be able to accommodate a particular maximum concentration of particulate material. The desired concentration of a particular particulate material within a particular layer of the multilayer overlay will depend on a variety of factors, including the target application for the material, the identities of the particulate and matrix materials, and the thickness of the individual layers. For example, an embodiment of a multilayer overlay according to the present disclosure adapted for application to interior surfaces of pipes, valves, flanges, and related parts for conducting tar sands or oil sands, which are highly abrasive, will require a relatively high concentration of particulate material in a particular layer. The interior surfaces of like parts for transporting relatively non-abrasive oil field or plant flow can be coated with layers including a relatively lower concentration of particulate material.

Again referring to FIG. 2, the apparatus 200 is depicted with only a single vibratory feed device 212, which includes a single conical hopper 240, feeder trough 242, drive motor 244, metering tube 248, and metering nozzle 246. However, it will be apparent that the apparatus 200 may include multiple vibratory feed devices, each for metering out a different particulate material into the weld deposit. Therefore, for example, if the layer being applied includes a first predetermined concentration of tungsten carbide particles and a second predetermined concentration of blocky diamond particles, a separate vibratory feed device may be provided for feeding each of the materials onto the molten weld deposit, and each of the separate vibratory feed devices will be set up to feed the particular particulate material at the desired rate to achieve the respective predetermined concentration in the applied layer of the overlay. Other arrangements for feeding the particular particulate materials to the molten weld deposit to achieve the desired particulate concentrations in the applied layer of an overlay according to the present disclosure will be apparent to those having ordinary skill in the welding art and are included within the scope of the present invention.

Figure 2:
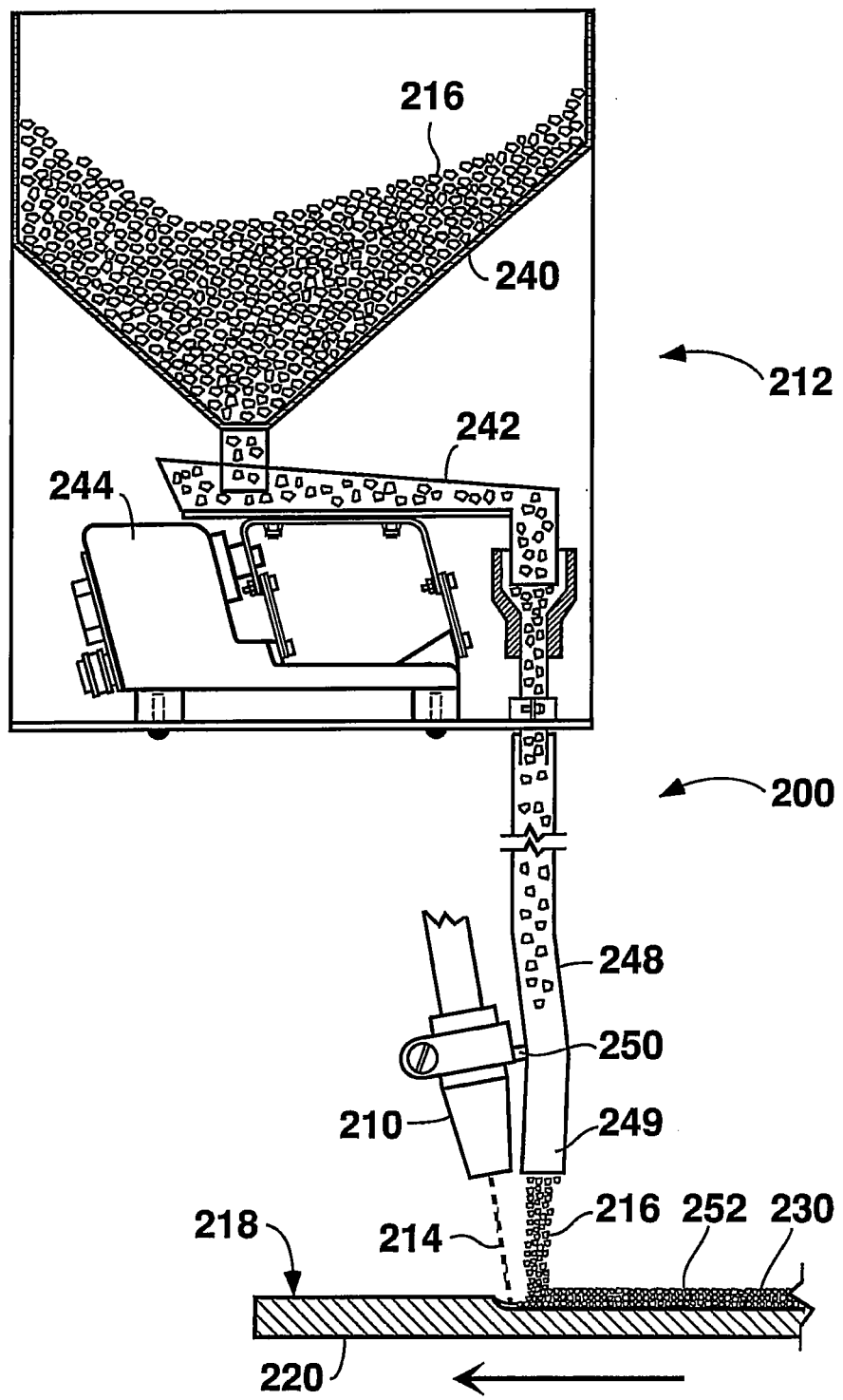
FIG. 2 is a schematic illustration of a non-limiting embodiment of certain elements of a system for applying a wear resistant multilayer overlay according to the present disclosure.

With further reference to FIG. 2, due to the generally rapid feed rate of the particulate material 216 and the effects of the rapid cooling of the molten matrix material 214, an excess of particulate material 216 may be supplied to the inner layer 230, resulting in particulate material remaining on the exposed surface of the inner layer 230. A second, outer layer of molten matrix material is overlaid on top of the first layer using apparatus 200 by similar relative motion between the base material 220 and the welding nozzle 210. Particulate material including, for example, blocky diamond particles, cubic boron nitride particles, and/or TSP diamond is introduced onto the molten weld deposit by vibratory feed apparatus 212 so as to become dispersed and embedded in the weld deposit, which solidifies to form an outer layer of the multilayer overlay. Excess particulate material present on the exposed surface of the inner layer will be incorporated into the second layer during the second pass of the apparatus 200. In addition to, for example, blocky diamond particles, cubic boron nitride particles, and/or TSP diamond, the particulate material fed from the vibratory feed apparatus 212 during the second pass of the apparatus 200 may include, for example, one or more of transition metal carbide particles and cubic boron nitride particles, which also become dispersed and embedded in the outer layer of the overlay. Applying the outer layer in a second pass of the apparatus 200 also may be beneficial as it anneals the inner layer, making the inner layer less likely to crack in service.

The apparatus 200 schematically depicted in FIG. 2 may be adapted to apply a wear resistant multilayer overlay according to the present invention on any metallic surface by conducting at least two welding passes with the apparatus to form an inner and an outer layer of the overlay. The overlay may be formulated to provide substantially improved resistance to corrosion, erosion, and/or abrasion to the treated surface. In some circumstances, the outer layer may require grinding of its exposed surface after its application to thereby smooth the surface, remove oxidation formed at high temperatures from the surface, and/or improve surface finish.

Figure 3:
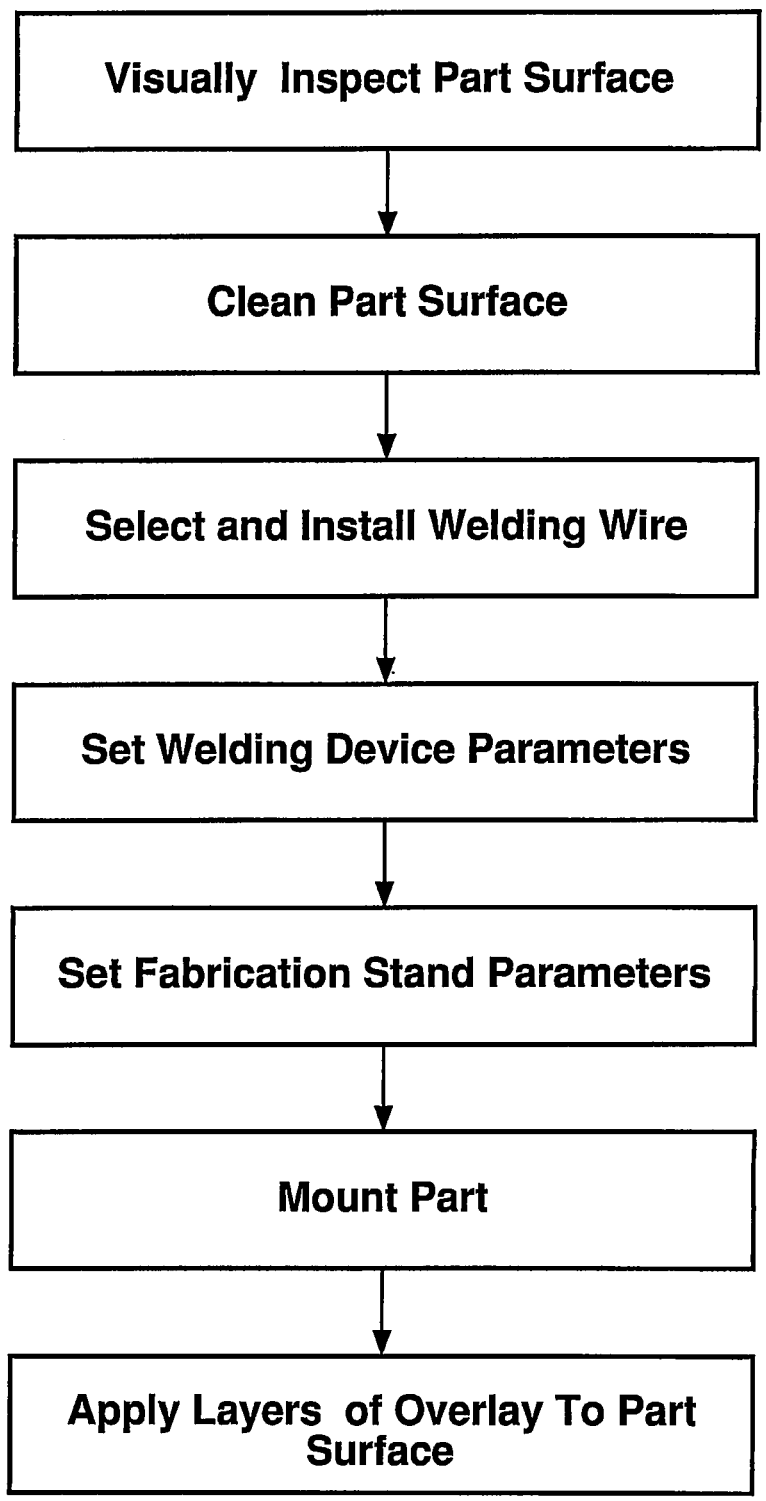
FIG. 3 is a flow diagram illustrating certain steps of one non-limiting process for applying a wear resistant multilayer overlay according to the present disclosure using the apparatus illustrated in FIG. 2.

Steps of a general process for applying the wear resistant multilayer overlay according to the present disclosure using the apparatus 200 described above and illustrated in FIG. 2 are described below and illustrated by the flow diagram of FIG. 3. It will be understood that the following steps are those of one non-limiting example of a process for applying the overlays and are not exclusive of the various processes that may be used to provide overlays according to the present disclosure on surfaces. Also, although the following non-limiting process describes applying an overlay according to the present disclosure to a single surface of a part, it will be understood that the process may be adapted to apply the same or a different overlay according to the present disclosure on more than one surface an/or on surface regions.

In a first process step, the part surface on which the overlay is to be applied is visually inspected for defects or damage. Any issues regarding the integrity or condition (appearance of significant surface corrosion, for example) should be resolved before proceeding to the next step. Corrosion, pitting, or other physical defects apparent on the surface may prevent a suitably strong bond from forming between the surface and the inner (first) layer of the overlay.

In a second process step, the surface on which the overlay is to be applied is cleaned to better ensure suitable bonding with the inner layer of the overlay. The surface is cleaned with a suitable degreasing agent. In some cases, the surface may have to be grit blasted to condition the surface to assure adequate bonding of the inner (first) layer. The part subsequently is heated in a furnace at 500° F. or, alternatively, the part surface is heated with a "rosebud" heating tip to 500° F. to achieve a suitable temperature for deposition of the materials included in the inner layer of the overlay.

In a third process step, a suitable welding wire is selected for use in the apparatus for applying the overlay that is described above and illustrated in FIG. 2. Those having ordinary skill may select a suitable welding wire based on the material from which the surface on which the overlay is to be applied is composed. Of course, a suitable welding wire will deposit an alloy that is compatible with the surface material and with the particulate materials to be included in the layer. As discussed above, a compatible alloy will forms a suitably strong metallurgical bond with the surface material and will not form alloys or solid mixtures with the surface material that exhibit unacceptable mechanical characteristics, corrosion, or other properties in the context of the particular application. For example, the matrix material may be selected from carbon steel, stainless steel, Inconel alloys, or another suitable alloy that provides an acceptable inner layer of the overlay when combined with the specific particulate material to be dispersed and embedded within it. The selected welding wire may be mounted on a spool spindle of the MIG welding device of the apparatus for applying the overlay described above and depicted in FIG. 2. The correct wire guide is installed on the welding device, and the weld wire is fed to the welding nozzle of the welding device.

In a fourth process step, the parameters of the welding operation are selected and set on the MIG welding device. The welding wire feed rate and the welding device voltage or current, depending on the type of equipment being used, are set so that a weld deposit of suitable form is provided on the part surface. Those having ordinary skill in welding may readily select suitable feed rates, voltages, currents, and any other welding device settings, based on the character of the surface and the welding wire used. The ground of the welding device is clamped to a solid metal piece, such as the part or the mounting fixture in which the part is secured.

In a fifth process step, a translatable fabrication stand programmable to move along X, Y, and Z axes is programmed for travel speed and distance along each axis and is then properly aligned with the welding device. As will be apparent to those having ordinary skill in welding, the parameters of the translatable fabrication stand are set so that when the part is secured in a predetermined orientation and position on the stand, the welding nozzle will move relative to the part in a pattern that results in the desired overlay being properly formed on the part surface.

In a sixth process step, the part is mounted in a fixture attached to the translatable fabrication stand in the position and orientation necessary so that the part moves with the stand relative to the welding nozzle in the desired pattern.

In a seventh process step, the layers of the overlay are applied to the surface using the welding device and the associated vibratory feed device in conjunction with the fabrication stand. The overlay application step may be broken down into a number of individual sub-steps, as follows.

The temperature of the part mounted in the fixture is checked. If the part's temperature is less than 450° F., the part surface is re-heated using a gas heating device with a "rosebud" heating tip until the surface temperature is at least 475° F. After confirming that the MIG welding device ground is properly connected, the welding gas feed is turned on. Particulate hard particles to be included in the weld deposit that serves as the metallic matrix material are loaded into a hopper of the vibratory feed device. As discussed above, those hard particles include, but are not limited to, one or more of transition metal carbide particles and boron nitride particles. If other particulate materials such as any of blocky diamond particles, non-blocky diamond particles, TSP diamond, cubic boron nitride particles, and PCD compacts are to be included in the applied layer, those materials are loaded into the hopper of second and, if needed, additional vibratory feed devices. Once sufficient particulate materials are loaded into the one or more vibratory feed devices and the one or more vibratory feed devices are set to the proper feed rates, the devices are switched on.

After ensuring that all operators and observers are wearing appropriate masks and other safety equipment, the welding device is switched on. The translatable fabrication stand is then switched on, and the inner (first) layer of the overlay is deposited on the surface in a first pass as the part moves past the welding nozzle and the particulate metering nozzle. The welding device and feeder devices are switched off, and the inner layer deposited in the first pass is then inspected.

If the inner layer is acceptable, then the particulate materials to be included in the outer (second) layer are loaded into the hoppers of the one or more vibratory feed devices and the devices are set to the appropriate feed rates to provide the desired concentration of each material in the outer layer. As discussed above, the materials that are embedded and dispersed within the outer layer may include, for example, transition metal carbide particles, boron nitride particles, blocky diamond particles, non-blocky diamond particles, TSP diamond, cubic boron nitride particles, and PCD compacts. The one or more vibratory feed devices are then switched on. After again ensuring that all operators and observers are wearing appropriate masks and other safety equipment, the welding device and feeder devices are switched on and the fabrication stand is activated to move the part in the programmed pattern to apply the outer layer onto the inner layer in a second pass of the welding device.

Once the inner and outer layers of the overlay have been applied to the part surface, the part is allowed to cool. Small parts may be placed in an insulated chamber to slow cooling and inhibit thermal cracking. Large parts may be allowed to cool art room temperature, without forced cooling. Those having ordinary skill will be able to determine a suitable cooling regimen for a particular part and overlay. Once the part has cooled, the overlay may be inspected and may be further processed as needed to remove any oxide scale and/or provide a desired surface finish on the overlay.

A wear resistant multilayer overlay according to the present disclosure reduces lost production time because it allows treated surfaces to withstand wear up to many times longer. The substantial increase in part service life provided by application of the present overlays reduces equipment shutdown frequency, and also may reduce the number of parts requiring servicing or replacement during shutdown. The present overlays also may eliminate or reduce the need for equipment rentals, insulation replacement, and inspection frequency, and reduce the overall number of man-hours necessary for maintenance and repair. In addition, material costs may be reduced by dispensing with the need to completely refurbish or replace parts and equipment after years of service. Instead, a new wear resistant multilayer overlay according to the present disclosure may be applied to worn parts and thereby render them suitable for substantial further use.

Although the foregoing description has necessarily presented only a limited number of embodiments, those of ordinary skill in the relevant art will appreciate that various changes in the details of the examples that have been described and/or illustrated herein may be made by those skilled in the art, and all such modifications will remain within the principle and scope of the present disclosure as expressed herein and in the appended claims. It will also be appreciated by those skilled in the art that changes could be made to the embodiments above without departing from the broad inventive concept thereof. It is understood, therefore, that this invention is not limited to the particular embodiments disclosed herein, but it is intended to cover modifications that are within the principle and scope of the invention, as defined by the claims.

We claim:

1. An article of manufacture selected from a pipe, a valve part, a pump part, a hammer, a drag line tooth, an excavating tooth, an excavating bucket part, a road scraper part, and a container, the article comprising a metallic surface and a wear resistant multilayer overlay disposed on at least a region of the surface, wherein the wear resistant multilayer overlay comprises:
   a first layer metallurgically bonded to at least a region of the metallic surface of the article, the first layer comprising a first continuous metallic matrix that is a weld deposit, at least one of blocky diamond particles, non-blocky diamond particles, TSP diamond, and PCD compacts embedded in the first continuous metallic matrix, and optionally, first hard particles embedded in the first continuous metallic matrix, wherein the first hard particles are at least one of transition metal carbide particles and boron nitride particles,
   wherein the total concentration of first hard particles, blocky diamond particles, non-blocky diamond particles, TSP diamond, and PCD compacts embedded in the first continuous metallic matrix is 40 to 85 volume percent based on the total volume of the first layer; and a second layer metallurgically bonded to at least a portion of the first layer, the second layer comprising
a second continuous metallic matrix that is a weld deposit,
at least one of blocky diamond particles, non-blocky diamond particles, TSP diamond, and PCD compacts embedded in the second continuous metallic matrix, and
optionally, second hard particles embedded in the second metallic matrix, wherein the second hard particles are at least one of transition metal carbide particles and boron nitride particles,
wherein the total concentration of second hard particles, blocky diamond particles, non-blocky diamond particles, TSP diamond, and PCD compacts embedded in the second continuous metallic matrix is 10 to 20 volume percent based on the total volume of the second layer.

2. The article of manufacture of claim 1, wherein the first layer comprises blocky diamond particles embedded in the first continuous metallic matrix.

3. The article of manufacture of claim 1, wherein the first metallic matrix and the second metallic matrix are metal alloys.

4. The article of manufacture of claim 3, wherein the first metallic matrix and the second metallic matrix each individually comprise a material selected from a carbon steel, a stainless steel, and a nickel-chromium superalloy.

5. The article of manufacture of claim 1, wherein the first hard particles and the second hard particles each individually comprise carbide particles of at least one of titanium, vanadium, chromium, manganese, iron, cobalt, nickel, copper, zinc, yttrium, zirconium, niobium, molybdenum, ruthenium, rhodium, palladium, silver, cadmium, hafnium, tantalum, and tungsten.

6. The article of manufacture of claim 1, wherein the total concentration of first hard particles, blocky diamond particles, non-blocky diamond particles, TSP diamond, and PCD compacts embedded in the first continuous metallic matrix is 40 to 75 volume percent based on the total volume of the first layer.

7. The article of manufacture of claim 1, wherein the total concentration of first hard particles, blocky diamond particles, non-blocky diamond particles, TSP diamond, and PCD compacts embedded in the first continuous metallic matrix is 40 to 60 volume percent based on the total volume of the first layer.

8. The article of manufacture of claim 1, wherein the total concentration of first hard particles, blocky diamond particles, non-blocky diamond particles, TSP diamond, and PCD compacts embedded in the first continuous metallic matrix is at least 40 volume percent based on the total volume of the first layer.

9. The article of manufacture of claim 1, wherein the total concentration of second hard particles, blocky diamond particles, non-blocky diamond particles, TSP diamond, and PCD compacts embedded in the second continuous metallic matrix is 10 to 20 volume percent based on the total volume of the second layer.

10. The article of manufacture of claim 2, wherein the total concentration of blocky diamond particles, non-blocky diamond particles, TSP diamond, and PCD compacts embedded in the first continuous metallic matrix is up to 20 volume percent based on the total volume of the first layer.

11. The article of manufacture of claim 2, wherein the total concentration of blocky diamond particles, non-blocky diamond particles, TSP diamond, and PCD compacts embedded in the first continuous metallic matrix is in the range of 0.5 to 20 volume percent based on the total volume of the first layer.

12. The article of manufacture of claim 1, wherein the second layer includes second hard particles, and at least 50 volume percent of the second hard particles embedded in the second continuous metallic matrix have a mesh size of −10 to +400.

13. The article of manufacture of claim 1, wherein the second layer includes second hard particles, and at least 50 volume percent of the second hard particles embedded in the second continuous metallic matrix have a mesh size of −30 to +400.

14. The article of manufacture of claim 1, wherein at least 50 volume percent of the total volume of blocky diamond particles, non-blocky diamond particles, TSP diamond, and PCD compacts embedded in the second continuous metallic matrix has a size of −10 mesh to +0.01 micron in linear diameter.

15. The article of manufacture of claim 1, wherein a thickness of the first layer is in the range of 3 to 15 mm.

16. The article of manufacture of claim 1, wherein a thickness of the second layer is in the range of 3 to 8 mm.

17. The article of manufacture of claim 1, wherein a thickness of the first layer is in the range of 3 to 15 mm, and a thickness of the second layer is in the range of 3 to 8 mm.

18. The article of manufacture of claim 1, wherein at least a portion of any blocky diamond particles, non-blocky diamond particles, TSP diamond, and PCD compacts embedded in the second continuous metallic matrix are coated with at least one of a metal and a metal alloy.

19. The article of manufacture of claim 1, wherein at least a portion of any blocky diamond particles, non-blocky diamond particles, TSP diamond, and PCD compacts embedded in the second continuous metallic matrix are coated with titanium.

20. The article of manufacture of claim 1, wherein the first continuous metallic matrix and the second continuous metallic matrix are individually selected from MIG welding deposits, TIG welding deposits, and plasma welding deposits.

21. The article of manufacture of claim 1, wherein:
the total concentration of first hard particles, blocky diamond particles, non-blocky diamond particles, TSP diamond, and PCD compacts in the first layer is 40 to 85 volume percent based on the total volume of the first layer;
at least 50 volume percent of the second hard particles embedded in the second continuous metallic matrix have a mesh size of −10 to +400;
at least 50 volume percent of the total volume of uncoated blocky diamond particles and TSP diamond embedded in the second metallic matrix have a toughness index of at least 35;
the total concentration of second hard particles, blocky diamond particles, non-blocky diamond particles, TSP diamond, and PCD compacts is 10 to 20 volume percent based on the total volume of the second layer;
the concentration of blocky diamond particles, non-blocky diamond particles, TSP diamond, and PCD compacts embedded in the second layer is 0.5 to 20 volume percent based on the total volume of the second layer; and
at least 50 volume percent of the total volume of blocky diamond particles, non-blocky diamond particles, TSP diamond, and PCD compacts embedded in the second continuous metallic matrix has a size in the range of −10 mesh to 0.01 micron.

22. The article of manufacture of claim 21, wherein a thickness of the first layer is in the range of 3 to 15 mm.

23. The article of manufacture of claim 21, wherein a thickness of the second layer is in the range of 3 to 8 mm.

24. The article of manufacture of claim 21, wherein a thickness of the first layer is in the range of 3 to 15 mm, and a thickness of the second layer is in the range of 3 to 8 mm.

25. The article of manufacture of claim 21, wherein the first metallic matrix and the second metallic matrix individually comprise a material selected from a carbon steel, a stainless steel, and a nickel-base superalloy.

26. The article of manufacture of claim 21, wherein the first hard particles and the second hard particles each individually comprise carbide particles of at least one of titanium, vanadium, chromium, manganese, iron, cobalt, nickel, copper, zinc yttrium, zirconium, niobium, molybdenum, ruthenium, rhodium, palladium, silver, cadmium, hafnium, tantalum, and tungsten.

27. The article of manufacture according to claim 1, wherein the article of manufacture is a pipe for transporting oil sands, and wherein the wear resistant multilayer overlay is disposed on at least a region of an interior surface of the pipe that is contacted by moving oil sands.

28. A method of improving the resistance of a metallic surface of an article of manufacture to erosion, corrosion, and abrasion, wherein the article of manufacture is selected from a pipe, a valve part, a pump part, a hammer, a drag line tooth, an excavating tooth, an excavating bucket part, a road scraper part, and a container, the method comprising:
providing a first layer to at least a region of the metallic surface, the first layer metallurgically bonded to the region and comprising at least one of blocky diamond particles, non-blocky diamond particles, TSP diamond, and PCD compacts embedded in a first continuous metallic matrix, the first layer optionally further comprising first hard particles that are at least one of transition metal carbide particles and boron nitride particles embedded in the first metallic matrix, wherein the total concentration of first hard particles, blocky diamond particles, non-blocky diamond particles, TSP diamond, and PCD compacts embedded in the first continuous metallic matrix is 40 to 85 volume percent based on the total volume of the first layer; and
providing a second layer metallurgically bonded to at least a region of the first layer, the second layer comprising at least one of blocky diamond particles, non-blocky diamond particles, TSP diamond, and PCD compacts embedded in a second continuous metallic matrix, the second layer optionally further comprising second hard particles that are at least one of transition metal carbide particles and boron nitride particles embedded in the second metallic matrix, wherein the total concentration of second hard particles, blocky diamond particles, non-blocky diamond particles, TSP diamond, and PCD compacts embedded in the second continuous metallic matrix is 10 to 20 volume percent based on the total volume of the second layer.

29. The method recited in claim 28, wherein:
providing the first layer comprises depositing the first continuous metallic matrix as a first welding deposit; and
providing the second layer comprises depositing the second continuous metallic matrix as a second welding deposit on at least a portion of the first layer.

30. The method of claim 28, wherein depositing the first continuous metallic matrix and depositing the second continuous metallic matrix are each individually conducted by a process selected from MIG welding, TIG welding, and plasma welding.

31. The method of claim 28, wherein the at least one of blocky diamond particles, non-blocky diamond particles, TSP diamond, and PCD compacts are introduced into the first welding deposit during welding, and wherein the at least one of blocky diamond particles, non-blocky diamond particles, TSP diamond, and PCD compacts are introduced into the second welding deposit during welding.

32. The method of claim 31, wherein the at least one of blocky diamond particles, non-blocky diamond particles, TSP diamond, and PCD compacts are introduced into the first welding deposit during welding, and wherein the at least one of blocky diamond particles, non-blocky diamond particles, TSP diamond, and PCD compacts are introduced into the second welding deposit during welding using a vibratory feed apparatus.

33. The article of manufacture according to claim 1, wherein the article of manufacture is a pipe for transporting oil sands, and wherein the wear resistant multilayer overlay is disposed on at least a region of an interior surface of the pipe that is contacted by moving oil sands.

34. The article of manufacture according to claim 21, wherein the article of manufacture is a pipe for transporting oil sands, and wherein the wear resistant multilayer overlay is disposed on at least a region of an interior surface of the pipe that is contacted by moving oil sands.

35. The method according to claim 28, wherein the article of manufacture is a pipe for transporting oil sands, and wherein the first layer is disposed on at least a region of an interior surface of the pipe that is contacted by moving oil sands.

* * * * *